US010746563B2

(12) United States Patent
Sly et al.

(10) Patent No.: US 10,746,563 B2
(45) Date of Patent: Aug. 18, 2020

(54) DISTRIBUTED AIR DATA SYSTEM ARCHITECTURE INCLUDING ACOUSTIC SENSORS

(71) Applicant: Rosemount Aerospace Inc., Burnsville, MN (US)

(72) Inventors: Jaime Sly, Savage, MN (US); Brian Brent Naslund, Chanhassen, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 244 days.

(21) Appl. No.: 15/975,367

(22) Filed: May 9, 2018

(65) Prior Publication Data

US 2019/0346279 A1 Nov. 14, 2019

(51) Int. Cl.
*G01C 23/00* (2006.01)
*G01C 9/00* (2006.01)
*G01P 5/16* (2006.01)

(52) U.S. Cl.
CPC ............ *G01C 23/00* (2013.01); *G01C 9/005* (2013.01); *G01P 5/16* (2013.01)

(58) Field of Classification Search
CPC .............................. G01C 23/00; G01C 23/005
See application file for complete search history.

(56) References Cited

U.S. PATENT DOCUMENTS

| 4,143,548 A * | 3/1979 | Graewe ................... G01P 5/248 |
| | | 702/144 |
| 5,550,736 A * | 8/1996 | Hay ......................... G05B 9/03 |
| | | 244/76 R |
| 5,585,557 A | 12/1996 | Loschke et al. |
| 7,155,969 B2 | 1/2007 | Drutowski et al. |
| 8,261,610 B2 * | 9/2012 | Choisnet ................. G01P 13/02 |
| | | 73/170.13 |
| 9,731,814 B2 | 8/2017 | McIntyre et al. |
| 2005/0131591 A1 | 6/2005 | Drutowski et al. |
| 2010/0186497 A1 | 7/2010 | Choisnet |
| 2017/0276790 A1 * | 9/2017 | Lodden ................... G01S 17/58 |

FOREIGN PATENT DOCUMENTS

| EP | 3223020 A1 | 9/2017 |
| FR | 2974908 A1 | 11/2012 |

OTHER PUBLICATIONS

Extended European Search Report for EP Application No. 19173614.9, dated Jul. 31, 2019, pp. 8.

* cited by examiner

*Primary Examiner* — Justin N Olamit
(74) *Attorney, Agent, or Firm* — Kinney & Lange, P.A.

(57) ABSTRACT

A system and method for an aircraft includes an air data system and an acoustic sensing system. The air data system includes a pitot tube positioned to sense a pitot pressure of an airflow about an exterior of the aircraft, and an angle of attack vane positioned to sense an angle of attack of the aircraft. The pitot pressure and the angle of attack are used to determine first air data parameters. The acoustic sensing system is configured to emit acoustic signals about the exterior of the aircraft and sense the acoustic signals as sensed data. The sensed data is used to determine second air data parameters.

15 Claims, 4 Drawing Sheets

DISTRIBUTED AIR DATA SYSTEM ARCHITECTURE INCLUDING ACOUSTIC SENSORS

BACKGROUND

The present disclosure relates generally to air data systems, and more particularly to air data systems utilizing traditional air data sensors and acoustic sensors for generating aircraft air data parameter outputs.

Modern aircraft often incorporate air data systems that calculate air data outputs based on measured parameters collected from various sensors positioned about the aircraft. For instance, the air data outputs may include angle of attack, angle of sideslip, calibrated airspeed, Mach number, altitude, or other air data parameters.

As aircraft systems such as flight control systems and stall protection systems become more highly integrated, complex, and automated, the integrity of air data information used by these aircraft systems becomes increasingly important. As such, these highly complex systems typically utilize redundant inputs of air data information that are measured by independent sources. The independent sources of air data are often desired to be derived from dissimilar equipment to reduce the risk of common mode errors occurring amongst the separate sources of air data. This redundancy, independence, and dissimilarity of air data outputs is strongly recommended worldwide by certification authorities and is typically required for airworthiness certification of the aircraft.

SUMMARY

A system for an aircraft includes an air data system and an acoustic sensing system. The air data system includes a pitot tube positioned to sense a pitot pressure of an airflow about an exterior of the aircraft, and an angle of attack vane positioned to sense an angle of attack of the aircraft. The pitot pressure and the angle of attack are used to determine first air data parameters. The acoustic sensing system is configured to emit acoustic signals about the exterior of the aircraft and sense the acoustic signals as sensed data. The sensed data is used to determine second air data parameters.

A system for an aircraft includes a pitot tube, at least one static port, a vane, an acoustic sensor system, and aircraft consuming systems. The pitot tube is configured to measure a pitot pressure on a side of the aircraft. The at least one static port is configured to sense a static pressure about the exterior of the aircraft. The vane is positioned on the exterior of the aircraft and configured to sense an angle of attack of the aircraft. The acoustic sensor system includes an emitter configured to emit acoustic signals into the airflow about the exterior of the aircraft and sense the acoustic signals as sensed data. The aircraft consuming systems are configured to receive the pitot pressure, the static pressure, the angle of attack, and the sensed data to determine air data parameters.

A method includes sensing, by a pitot tube positioned on an exterior of an aircraft, a pitot pressure; sensing, by a first vane positioned on the exterior of the aircraft, an angle of attack; sensing, by a second vane positioned on the exterior of the aircraft, an angle of sideslip; sensing, by a static port positioned on the exterior of the aircraft, a static pressure; generating first aircraft air data parameter outputs based on the pitot pressure, the angle of attack, the angle of sideslip, and the static pressure; emitting, by an acoustic sensor system positioned on the exterior of the aircraft, acoustic signals; sensing, by the acoustic sensor system, the acoustic signals as sensed data; and generating second aircraft air data parameter outputs based on the sensed data.

DETAILED DESCRIPTION

As described herein, an example air data system architecture includes at least a first air data system and an acoustic sensor system to provide at least two independent sets of aircraft air data parameter outputs. The first air data system includes at least a pitot probe, an angle of attack (AOA) vane, an angle of sideslip (AOS) vane, and at least one static port, and may be configured to provide first aircraft air data parameters. The acoustic sensor system may form a second air data system providing second aircraft air data parameter outputs. The acoustic sensor system may include multiple acoustic sensors positioned on the aircraft exterior in separate geometric planes. Each acoustic sensor is configured to emit acoustic signals, such as acoustic pulses, for example, into an airflow about the aircraft exterior and sense the emitted signals to generate the second aircraft air data parameter outputs.

Figure 1:
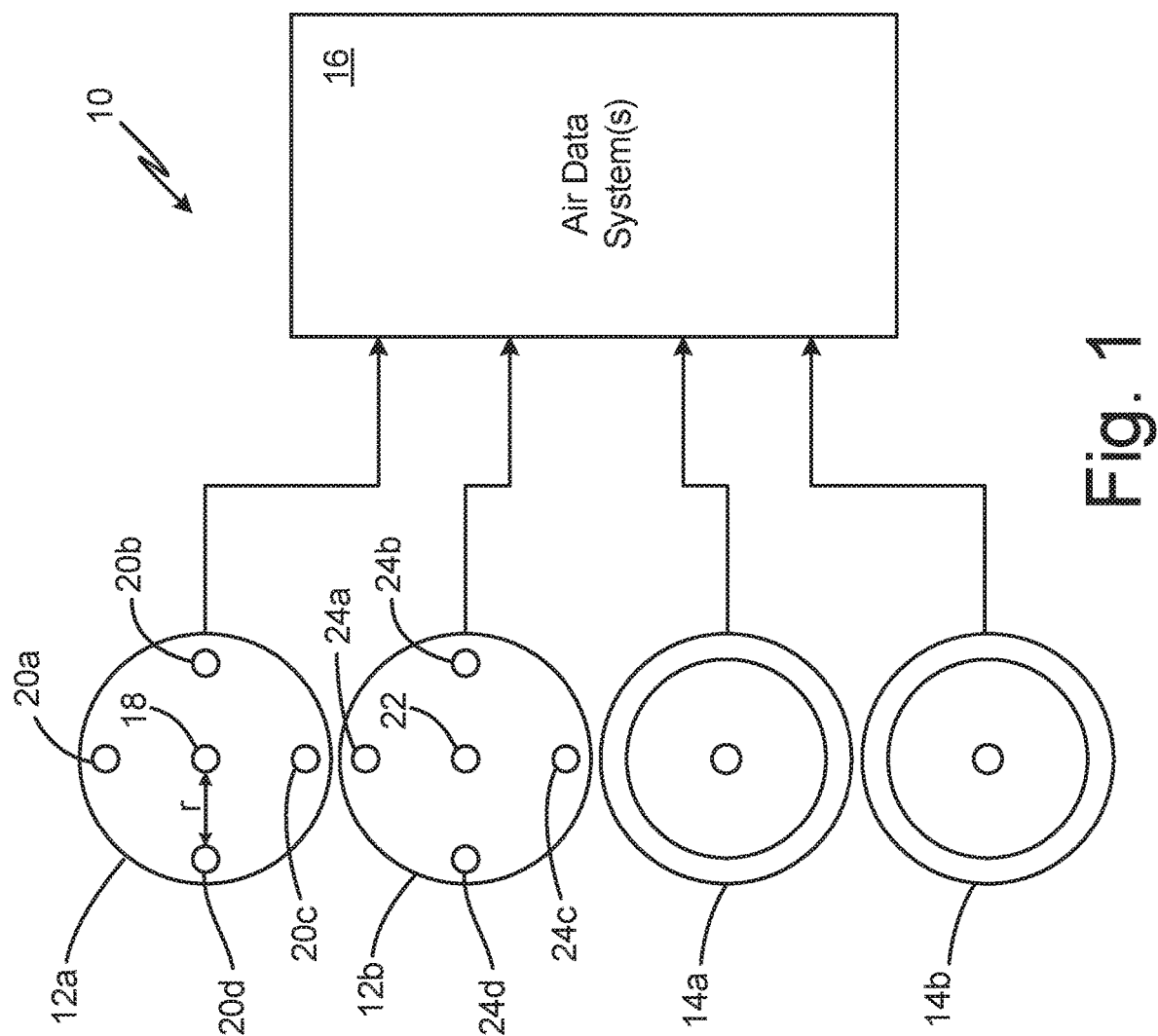
FIG. 1 is a schematic block diagram illustrating an example embodiment of an acoustic sensor system that forms an aircraft air data system.

FIG. 1 is a schematic block diagram illustrating an example embodiment of an acoustic sensor system. Acoustic sensor system 10 includes acoustic sensors 12a and 12b, static ports 14a and 14b, and air data system(s) 16. Sensor system 10 can include any combination of sensors 12a and 12b, and static ports 14a and 14b. When including all of sensors 12a and 12b, and static ports 14a and 14b, a full suite of air data parameters is obtainable for an aircraft that includes system 10. For example, acoustic sensor system 10 is capable of determining AOA, AOS, static air temperature (SAT), and static pressure. Acoustic sensor 12a includes emitter 18 and microphones 20a-20d, and acoustic sensor 12b includes emitter 22 and microphones 24a-24d. Air data system(s) 16 may include an air data computer, hosted air data application, or any other system capable of receiving sensed data and generating air data parameters. While illustrated and described as acoustic sensors that include an emitter centered within four microphones, other embodiments of acoustic sensors 12a and 12b may include any configuration capable of emitting and receiving acoustic signals. For example, acoustic sensors 12a and 12b may include fewer or greater than four microphones arranged in any manner to sense acoustic signals from emitters 18 and 22. In other embodiments, one or both of acoustic sensors 12a and 12b may include an array of transducers capable of both emitting and receiving acoustic signals.

An acoustic sensor system implemented on an aircraft may include one or more of acoustic sensors 12a and 12b, and static ports 14a and 14b, in any combination, based upon the needs of the aircraft. For example, an aircraft may include only acoustic sensor 12a, which may be positioned at any point on the exterior of the aircraft. In one embodiment, acoustic sensor 12a may be positioned on the side of the aircraft and emitter 18 may emit acoustic signals into the airflow along the side of the aircraft. Each microphone 20a-20d may be positioned to sense the emitted acoustic signals. In one example embodiments, the acoustic signals may be acoustic pulses emitted at any desired frequency. For example, acoustic sensor 12a may be an ultrasonic acoustic sensor, emitting pulses at greater than 20 kHz. In other embodiments, acoustic sensor 12a may be configured to emit pulses in the audible range. In other embodiments, acoustic sensor 12a may be configured to emit a continuous sound wave rather than pulses.

In the example embodiment illustrated in FIG. 1, microphones 20a and 20c are orthogonal to microphones 20b and 20d. The distance (r) between emitter 18 and each microphone 20a-20d is known. The distance between each microphone 20a-20d and emitter 18 may be equal, or may vary for each microphone 20a-20d. For example, the distance (r) between each microphone 20a-20d and emitter 18 may be between 4 and 5 inches. In this embodiment, if acoustic sensor 12a is an ultrasonic sensor configured to emit acoustic pulses at 40 kHz, it will take on the order of 200 to 5000 microseconds, depending upon airflow and ambient conditions, for each acoustic pulse to reach each microphone 20a-20d.

Knowing the distance (r) between each microphone 20a-20d and emitter 18, time of flight for the acoustic signals can be determined for each microphone 20a-20d. Using two microphones along the same axis, the speed of sound in the direction of the two microphones can be determined. For example, acoustic sensor 12a may be positioned on the right side of the aircraft. For an aircraft in the u-v-w three-dimensional space (e.g., the u axis extends along the body and through the nose of the aircraft, the v axis extends out through the side of the aircraft, and the w axis extends through the bottom of the aircraft), acoustic sensor 12a is positioned in the u-w geometric plane. Thus, microphones 20a and 20c can be used to obtain a velocity in the w axis direction, and microphones 20b and 20d can be used to obtain a velocity in the u axis direction. These two velocities can be used to form a two-dimensional velocity vector for the u-w plane. Because acoustic sensor 12a is on the side of the aircraft, the two-dimensional velocity vector can be used to determine an AOA for the aircraft.

In another embodiment, acoustic sensor 12a may be positioned on the top or bottom of the aircraft. For example, acoustic sensor 12a may be positioned on the top of the aircraft in the geometric u-v plane. In this embodiment, microphones 20a and 20c can be used to determine a velocity in the u axis direction, and microphones 20b and 20d can be used to determine a velocity in the v axis direction. Because acoustic sensor 12a is on the top of the aircraft, the two-dimensional velocity vector for the u-v plane can be used to determine an AOS for the aircraft.

Acoustic sensor 12a is also capable of providing a static air temperature, regardless of the position on the exterior of the aircraft. Two microphones along the same axis, such as microphones 20a and 20c, may be used to sense the acoustic signals from emitter 18. Microphone 20c may sense the time of flight of the acoustic signals upstream of emitter 18 and microphone 20a may sense the time of flight of the acoustic signals downstream of emitter 18. Knowing the distance between microphones 20a and 20c, the speed of sound may be determined, which can then be used to calculate the air temperature. Thus, an aircraft system that includes only a single acoustic sensor is capable of providing parameter outputs that include a two-dimensional velocity vector and a static air temperature. The two-dimensional velocity vector can be used to determine either AOA or AOS, depending upon the physical location of the acoustic sensor on the aircraft.

Figure 2A:
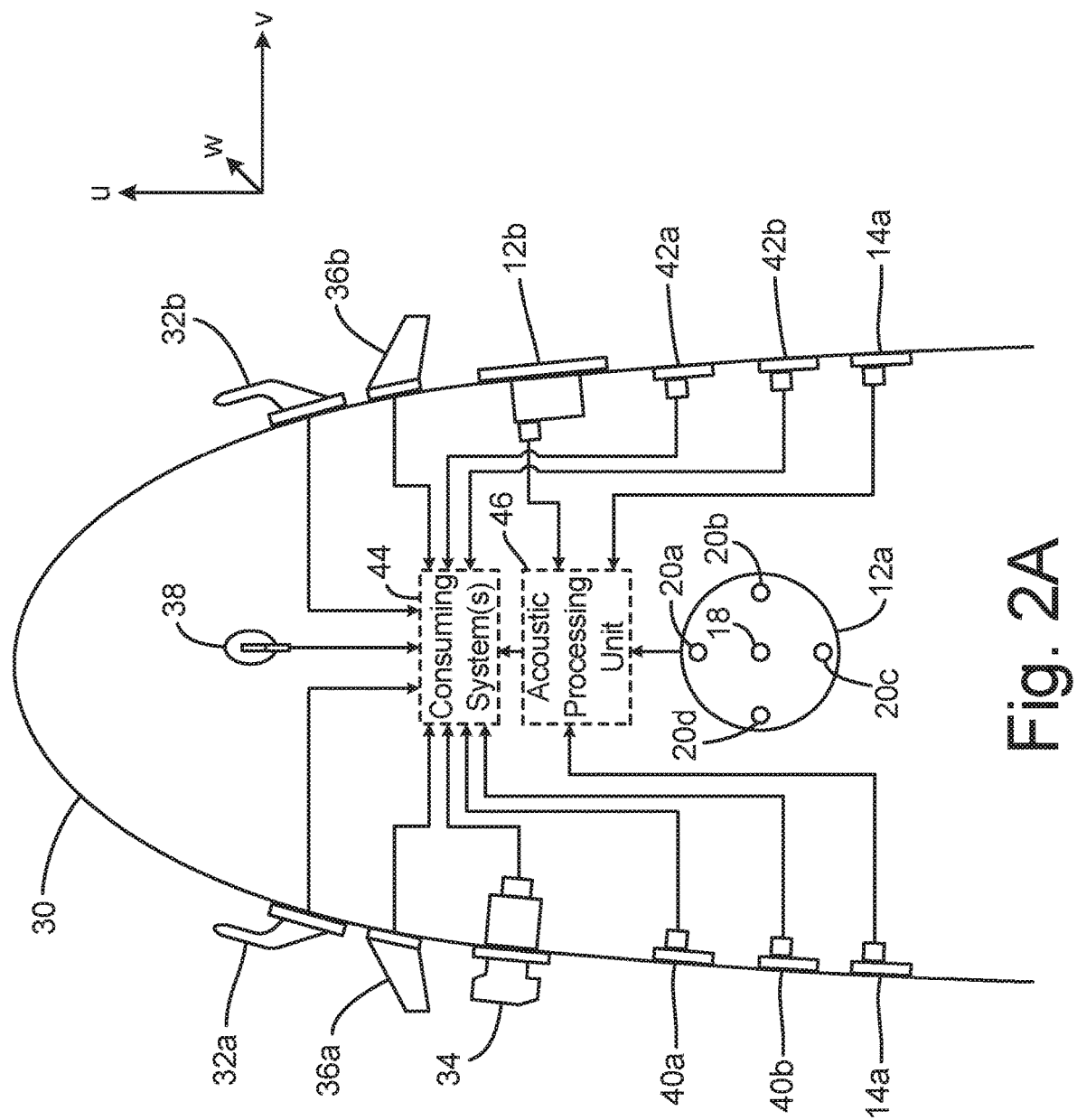
FIGS. 2A and 2B are schematic diagrams illustrating an aircraft air data architecture according to an embodiment.

In another embodiment, in addition to the first acoustic sensor 12a, a second acoustic sensor 12b may be positioned on the aircraft in a geometric plane different from acoustic sensor 12a. For example, and as illustrated in FIG. 2A, the first acoustic sensor 12a may be implemented on the top or bottom of the aircraft in the u-v plane, while the second acoustic sensor 12b may be implemented on the side of the aircraft in the u-w plane. Acoustic sensor 12b may operate in a substantially similar manner to acoustic sensor 12a. Acoustic sensor 12a is capable of obtaining the two-dimensional velocity vector in the u-v plane and acoustic sensor 12b is capable of obtaining a two-dimensional velocity vector in the u-w plane. The two two-dimensional velocity vectors from the two respective acoustic sensors 12a and 12b allow the acoustic system to determine both AOA and AOS.

In addition to one or both of acoustic sensors 12a and 12b, one or both of static pressure ports 14a and 14b may be included on the exterior of the aircraft. For example, static pressure port 14a may be positioned on the left side of the aircraft and static pressure port 14b may be positioned on the right side of the aircraft to sense static pressure. Therefore, using acoustic sensors 12a and 12b, and static pressure ports 14a and 14b, air data systems 16 can generate a full suite of aircraft air data parameters. In other embodiments, acoustic sensors 12a and 12b may include integrated static pressure ports, or may be configured to determine static pressure acoustically, eliminating the need for separate static ports 14a and 14b.

Figure 2B:
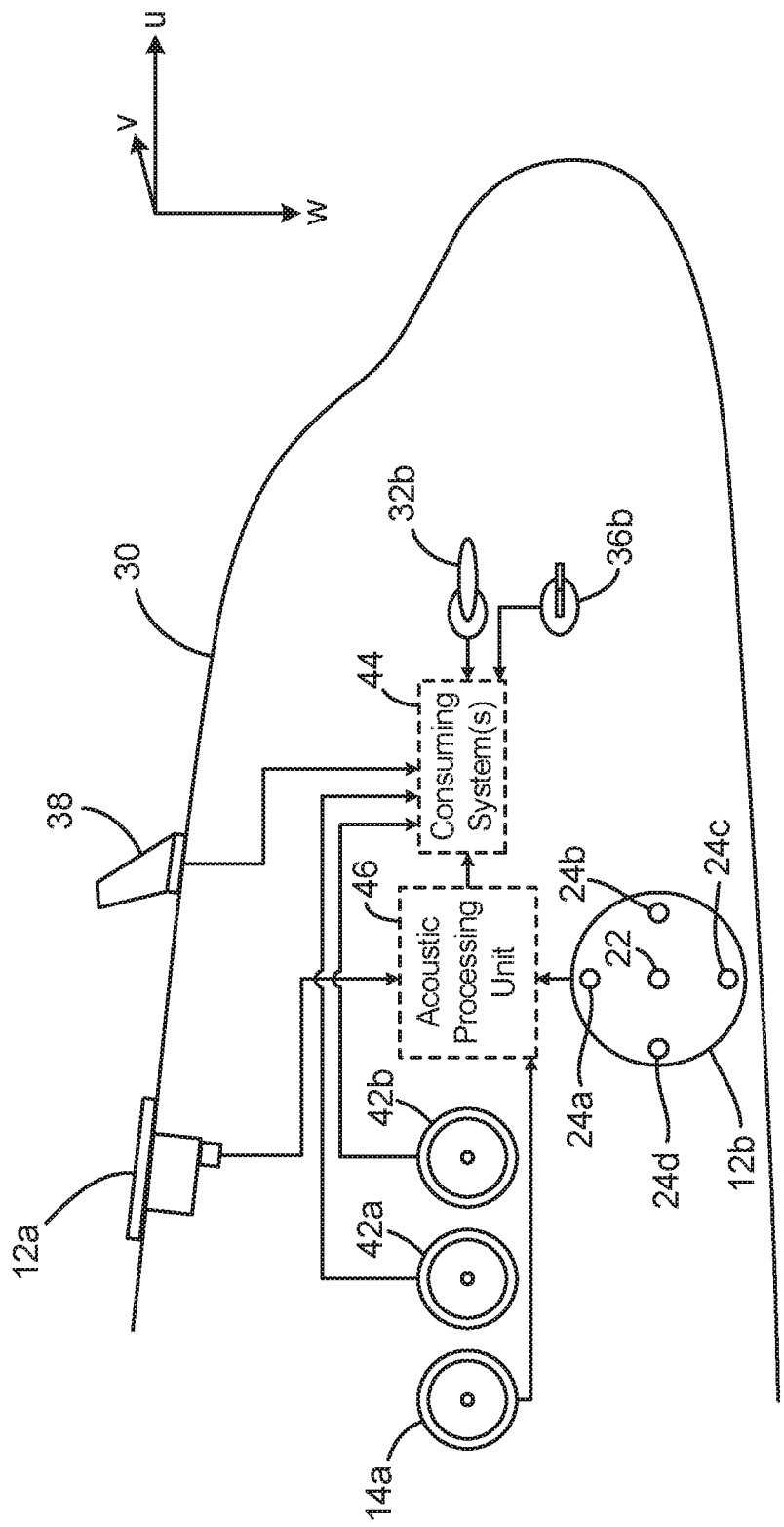

FIGS. 2A and 2B are schematic block diagrams illustrating an example air data system architecture for aircraft 30 that includes acoustic sensors 12a and 12b, static ports 14a and 14b, pitot tubes 32a and 32b, TAT sensor 34, AOA vanes 36a and 36b, AOS vane 38, and static ports 40a, 40b, 42a, and 42b. FIG. 2A is a top-down view of aircraft 30 in the u-v plane and FIG. 2B is a side view of aircraft 30 in the u-w plane. FIGS. 2A and 2B will be discussed together. Three separate air data systems are illustrated in the example embodiment shown in FIGS. 2A and 2B. Other embodiments may include fewer (e.g., two) or more separate air data systems. A first air data system may include pitot tube 32a, AOA vane 36a, AOS vane 38, and static ports 40a and 42. A second air data system may include pitot tube 32b, AOA vane 36b, AOS vane 38 (or a separate AOS vane positioned on the bottom of the aircraft, for example), and static ports 40b and 42b, and a third air data system may include acoustic sensors 12a and 12 and static ports 14a and 14b.

Acoustic sensor 12a includes emitter 18 configured to emit acoustic signals into the airflow and microphones 20a-20d are positioned and configured to sense the acoustic signals from emitter 18. Acoustic sensor 12b includes emitter 22 configured to emit acoustic signals into the airflow and microphones 24a-24d are positioned and configured to sense the acoustic signals from emitter 22. As illustrated in FIG. 2A, acoustic sensors 12a and 12b, and static ports 14a and 14b form an air data system that provides aircraft air data parameter outputs that are generated based in part upon time of flight measurements of the acoustic signals emitted by emitter 18, as discussed above. While illustrated in FIG. 2A as including all of acoustic sensors 12a and 12b, and static ports 14a and 14b, aircraft 30 may include any combination of acoustic sensors 12a and/or 12b, and/or static ports 14a and/or 14b.

Acoustic processing unit 46 is electrically coupled to send (and, in some examples, receive) data to/from consuming systems 44. Consuming systems 44 can include aircraft systems, such as flight management systems, auto-flight control systems, standby instrument systems, display systems, data concentrator units, or other consuming systems of air data parameter outputs. Connections illustrated in FIGS. 2A and 2B can take the form of direct electrical couplings and/or data bus couplings configured to communicate according to one or more communication protocols, such as the Aeronautical Radio, Incorporated (ARINC) 429 communication protocol, controller area network (CAN) bus communication protocol, military standard 1553 (MIL-STD-1553) communication protocol, Ethernet, or other analog or digital communication protocols. In other embodiments, some of the connections may be pneumatic. For example, in another example embodiment, static ports 40a and 40b, and 42a and 42b, may be pneumatically connected to one another.

Acoustic processing unit 46 may be any computer, microprocessor, controller, or other digital circuit configured to calculate air data parameters based on sensed data from acoustic sensors 12a and 12, and static ports 14a and 14b. In the embodiment illustrated in FIGS. 2A and 2B, sensed analog data is provided to acoustic processing unit 46, which converts the analog data into digital data, and calculates the air data parameters using the digital data. The air data parameter outputs from acoustic processing unit 46 are provided to consuming systems 44. In other embodiments, acoustic sensors 12a and 12b, and/or static ports 14a and 14b may include local processing circuitry to supplement and/or eliminate the need for acoustic processing unit 46. For example, acoustic sensor 12a may include a local processor such that data from acoustic sensor 12b and static ports 14a and 14b can be provided to the local processor of acoustic sensor 12a for calculation of the air data parameter outputs. The local processor of acoustic sensor 12a can then provide the air data parameter outputs directly to consuming systems 44.

In operation, pitot tubes 32a and 32b are positioned to receive airflow and sense a total (or pitot) pressure of the airflow external to aircraft 30. TAT sensor 34 includes one or more temperature sensing elements and conditioning circuitry for sensing total air temperature of airflow about the exterior of aircraft 30. TAT sensor 34 is configured to provide total air temperature data corresponding to measured total air temperature of the airflow for consuming systems 44. Vanes 36a and 36b are positioned on the sides of aircraft 30 and configured to sense an angle of attack of aircraft 30. For example, each vane 36a and 36b may include a resolver configured to output an analog signal indicative of the position of the vane. The analog signal may be provided to consuming systems 44, which may determine the angle of attack of aircraft 30 based on the analog signal. In other embodiments, each vane 36a and 36b may have local circuitry configured to output a digital signal indicative of AOA of aircraft 30 based on the position of the vane. Vane 38, which may function in a similar manner to vanes 36a and 36b, may be positioned on the top or bottom of the aircraft to sense AOS, and static ports 40a, 40b, 42a, and 42b sense static pressure.

Each of the above sensed values may be provided to consuming systems 44, or determined by consuming systems 44 using raw signals provided by the above components. Consuming systems 44 may generate air data parameters based on the sensed values from pitot tubes 32a and 32b, TAT sensor 34, AOA vanes 36a and 36b, AOS vane 38, and static ports 40a, 40b, 42a, and 42b. Examples of local air data parameters include, but are not limited to, AOA, static pressure, calibrated airspeed, Mach number, and local pressure altitude.

In one embodiment, pitot tube 32a, AOA vane 36a, AOS vane 38, and static ports 40a and 40b may be used by consuming systems 44 to generate first air data parameters. For example, pitot probe 32a can sense a first pitot pressure for aircraft 30, and static ports 40a and 40b can sense a first static pressure for aircraft 30. The first pitot pressure and the first static pressure can be used by consuming systems 44 to calculate an airspeed for aircraft 30. AOA vane 36a and AOS vane 38 can be used to calculate AOA and AOS for aircraft 30. Additionally, in the above embodiment, pitot tube 32b, TAT sensor 34, AOA vane 36b, AOS vane 38 (or another AOS vane not illustrated in FIGS. 2A and 2B), and static ports 42a and 42b may be used by consuming systems 44 to generate second air data parameters in a similar manner to the first air data parameters.

Acoustic sensors 12a and 12b, and static pressure ports 14a and 14b, as described above, may form an additional air data system for aircraft 30 that provides, for example, third aircraft air data parameters may be determined based on sensing of acoustic signals emitted by sensors 12a and 12b. Local flow calibration may be performed for the acoustic system by acoustic processing unit 46, or by other software implemented elsewhere on aircraft 30. The three aircraft air data parameters can each include the same air data parameters. As such, an air data system architecture according to techniques described herein can provide three independent sets of redundant air data parameter outputs for use by, e.g., consuming systems 44.

While illustrated as three separate air data systems in FIGS. 2A and 2B, other embodiments may include fewer or greater than three air data systems. For example, an aircraft may include only one pitot probe 32a, one AOA vane 36a, AOS vane 38, and one or both of static ports 40a and 40b, which may form a first air data system in addition to the acoustic sensing system for a total of two air data systems for aircraft 30.

Consuming systems 44, in some examples, utilize each of the first aircraft air data parameter outputs, the second aircraft air data parameter outputs, and the third aircraft air data parameter outputs, alone or in combination, as part of a primary aircraft air data set. For instance, one or more of consuming systems 44 (e.g., a flight management system, an auto-flight control system, or any one or more other consuming systems) can utilize each of the first aircraft air data parameter outputs, the second aircraft air data parameter outputs, and the third aircraft air data parameter outputs in a voting scheme to select one or more of the first, second, and/or third air data parameter outputs for active use by consuming systems 44.

In some examples, one or more of consuming systems 44 can identify the presence of a failure condition in one or more of the first air data system, the second air data system, and the third air data system based on a comparison of the first aircraft air data parameter outputs, the second aircraft air data parameter outputs, and the third aircraft air data parameter outputs. For instance, in examples where only two of the first, second, and third aircraft air data parameter outputs agree (e.g., include parameter output values that are within a threshold deviation), consuming systems 44 can identify the presence of a failure condition in the remaining one of the first, second, and third air data systems that provides air data parameter outputs that do not agree (e.g., includes parameter output values that are not within the threshold deviation from the remaining two systems). Consuming systems 44 can refrain from utilizing air data parameter outputs from the identified air data system having the failure condition, thereby increasing integrity of the air data parameter outputs utilized for, e.g., flight control functions of aircraft 30. In addition, consuming systems 44 can, in certain examples, store, annunciate, or otherwise indicate the presence of the failure condition in the identified air data system, thereby facilitating maintenance operations on components of the identified air data system having the failure condition.

In some examples, consuming systems 44 include one or more standby (or backup) instruments or components, such as a standby flight display unit, that are utilized by flight control systems, pilots, or other systems in the event of a failure condition of designated primary air data system components. In certain examples, one or more of the first aircraft air data parameter outputs, the second aircraft air data parameter outputs, and the third aircraft air data parameter outputs can be provided to the standby instruments or components for use by, e.g., a pilot, in the event of degraded operation of designated primary instruments and/or components. For instance, the third aircraft air data parameter outputs provided by the third air data system (e.g., formed by acoustic sensors 12a and 12b, and static ports 14a and 14b) can be provided to the standby instruments or components.

As such, an air data system architecture implementing techniques described herein provides three independent air data systems formed by pitot tubes 32a and 32b, TAT sensor 34, AOA vanes 36a and 36b, AOS vane 38, and static ports 40a, 40b, 42a, and 42b, and an acoustic sensor system that includes acoustic sensors 12a and 12b and static ports 14a and 14b. Acoustic technology provided by acoustic sensors 12a and 12b used to form the third air data system provides aircraft air data parameter outputs using dissimilar measurements as compared with the traditional measurements of pitot tubes 32a and 32b, TAT sensor 34, AOA vanes 36a and 36b, AOS vane 38, and static ports 40a, 40b, 42a, and 42b. Accordingly, techniques of this disclosure can help to increase dissimilarity of the air data systems, reducing the impact of common-mode failures of the traditional systems. For example, the acoustic system may be flush or semi-flush to the skin of the aircraft, reducing the impact of icing conditions experienced by the traditional systems.

Figure 3:
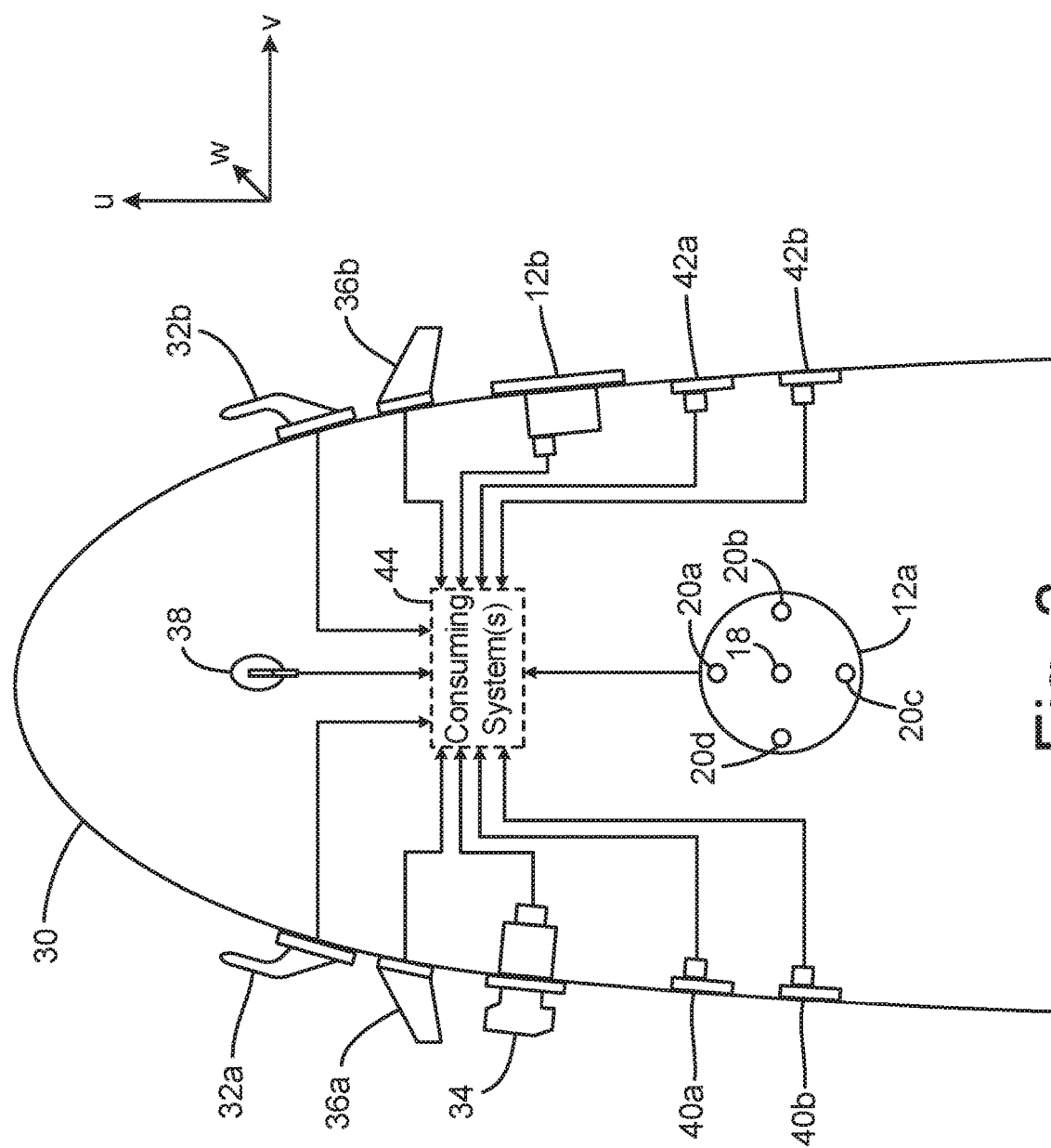
FIG. 3 is a schematic diagram illustrating another embodiment of an aircraft air data architecture.

FIG. 3 is a schematic diagram illustrating another example air data system architecture for aircraft 30' including acoustic sensors 12a and 12b, pitot tubes 32a and 32b, TAT sensor 34, AOA vanes 36a and 36b, AOS vane 38, and static ports 40a, 40b, 42a, and 42b. In the embodiment illustrated in FIG. 3, acoustic sensors 12a and 12b do not act as a separate air data system, but rather are connected to provide data directly to consuming systems 44. In this embodiment, rather than being a separate, redundant, air data system, the sensed data from acoustic sensors 12a and 12b can be used by consuming systems 44 for performance enhancement and fault detection.

For example, in the event that any of pitot tubes 32a and 32b, TAT sensor 34, AOA vanes 36a and 36b, AOS vane 38, or static ports 40a, 40b, 42a, and 42b become unavailable for any reason, consuming systems 44 can use sensed data from acoustic sensors 12a and 12b to account for the failed components. This way, rather than acting as a separate air data system, acoustic sensors 12a and 12b may be used to provide redundant data and fault accommodation for pitot tubes 32a and 32b, TAT sensor 34, AOA vanes 36a and 36b, AOS vane 38, and static ports 40a, 40b, 42a, and 42b.

Discussion of Possible Embodiments

The following are non-exclusive descriptions of possible embodiments of the present invention.

A system for an aircraft includes a first air data system and an acoustic sensing system. The first air data system includes a first pitot tube positioned to sense a first pitot pressure of an airflow about an exterior of the aircraft, and a first angle of attack vane positioned to sense a first angle of attack of the aircraft. The first pitot pressure and the first angle of attack are used to determine first air data parameters. The acoustic sensing system is configured to emit acoustic signals about the exterior of the aircraft and sense the acoustic signals as sensed data. The sensed data is used to determine second air data parameters.

The system of the preceding paragraph can optionally include, additionally and/or alternatively, any one or more of the following features, configurations and/or additional components:

A further embodiment of the foregoing system, wherein the first air data system further includes an angle of sideslip vane positioned to sense an angle of sideslip of the aircraft; and at least one first static port configured to sense a first static pressure about the exterior of the aircraft. The first pitot pressure and the first static pressure are utilized to determine an airspeed of the aircraft.

A further embodiment of any of the foregoing systems, further including an acoustic processing unit configured to receive the sensed data from the acoustic sensor system and generate the second air data parameters based on the sensed data.

A further embodiment of any of the foregoing systems, further including at least one consuming system of the aircraft, wherein the consuming system is configured to receive the first pitot pressure and the first angle of attack and determine the first air data parameters, and is further configured to receive the second air data parameters from the acoustic processing unit.

A further embodiment of any of the foregoing systems, wherein the acoustic sensor system includes a first acoustic sensor that includes an emitter, and first, second, third, and fourth microphones, wherein the first and second microphones are orthogonal to the third and fourth microphones.

A further embodiment of any of the foregoing systems, wherein the acoustic sensor system includes a first acoustic sensor; and a second acoustic sensor; wherein the first acoustic sensor is positioned on the exterior of the aircraft and lies in a first geometric plane, and the second acoustic sensor is positioned on the exterior of the aircraft and lies in a second geometric plane, different from the first geometric plane.

A further embodiment of any of the foregoing systems, wherein the second air data parameters include angle of attack, angle of sideslip, an airspeed, and an air temperature.

A further embodiment of any of the foregoing systems, wherein the first and second acoustic sensors are ultrasonic acoustic sensors, and wherein the acoustic signal comprises acoustic pulses.

A further embodiment of any of the foregoing systems, wherein the acoustic sensor system further includes at least one static port positioned to sense a static pressure of an airflow about the exterior of the aircraft.

A further embodiment of any of the foregoing systems, further including a second air data system that includes a second pitot tube positioned to sense a second pitot pressure of an airflow about the exterior of the aircraft; a second angle of attack vane positioned to sense a second angle of attack of the aircraft; and at least one second static port configured to sense a second static pressure about the exterior of the aircraft. The second pitot pressure and the second static pressure are also utilized to determine an airspeed of the aircraft.

A system for an aircraft includes a first pitot tube, at least one first static port, a first vane, an acoustic sensor system, and aircraft consuming systems. The first pitot tube is configured to measure a first pitot pressure on a first side of the aircraft. The at least one first static port is configured to sense a first static pressure about the exterior of the aircraft. The first vane is positioned on the exterior of the aircraft and configured to sense a first angle of attack of the aircraft. The acoustic sensor system includes a first emitter configured to emit first acoustic signals into the airflow about the exterior of the aircraft and sense the first acoustic signals as first sensed data. The aircraft consuming systems are configured to receive the first pitot pressure, the first static pressure, the first angle of attack, and the first sensed data to determine air data parameters.

The system of the preceding paragraph can optionally include, additionally and/or alternatively, any one or more of the following features, configurations and/or additional components:

A further embodiment of the foregoing system, wherein the first sensed data is utilized by the consuming systems to supplement the first pitot pressure and the first angle of attack.

A further embodiment of any of the foregoing systems, wherein the acoustic sensor system includes an acoustic processing unit, and at least one second static pressure port configured to sense a second static pressure of airflow about an exterior of the aircraft; and the acoustic processing unit is configured to generate a first set of aircraft air data parameter outputs based on the first sensed data.

A further embodiment of any of the foregoing systems, wherein the acoustic sensor system further includes a second emitter configured to emit second acoustic signals into the airflow about the exterior of the aircraft and is configured to sense the second acoustic signals as second sensed data, wherein the first emitter and the second emitter are positioned in different geometric planes.

A further embodiment of any of the foregoing systems, wherein the acoustic processing unit is configured to calculate angle of sideslip, angle of attack, an airspeed, and an air temperature for the aircraft based on the first and second sensed data.

A further embodiment of any of the foregoing systems, wherein the aircraft consuming systems are configured to generate a second set of aircraft air data parameter outputs based on the first pitot pressure, the first static pressure, and the first angle of attack, and wherein the first and the second sets of aircraft air data parameter outputs comprise the same set of air data parameters.

A further embodiment of any of the foregoing systems, wherein a second pitot tube configured to measure a second pitot pressure on a second side of the aircraft opposite the first side; a second vane positioned on the exterior of the aircraft and configured to sense a second angle of attack of the aircraft; a third vane positioned on the exterior of the aircraft and configured to sense an angle of sideslip of the aircraft; wherein the aircraft consuming systems are further configured to receive the second pitot pressure, the second angle of attack, and the angle of sideslip to determine the air data parameters.

A further embodiment of any of the foregoing systems, further including a total air temperature sensor configured to provide a sensed temperature to the aircraft consuming systems, wherein the aircraft consuming systems are further configured to determine the air data parameters using the sensed temperature.

A method includes sensing, by a pitot tube positioned on an exterior of an aircraft, a pitot pressure; sensing, by a first vane positioned on the exterior of the aircraft, an angle of attack; sensing, by a second vane positioned on the exterior of the aircraft, an angle of sideslip; sensing, by a static port positioned on the exterior of the aircraft, a static pressure; generating first aircraft air data parameter outputs based on the pitot pressure, the angle of attack, the angle of sideslip, and the static pressure; emitting, by an acoustic sensor system positioned on the exterior of the aircraft, acoustic signals; sensing, by the acoustic sensor system, the acoustic signals as sensed data; and generating second aircraft air data parameter outputs based on the sensed data.

A further embodiment of the foregoing method, further including determining the presence of a failure condition of one or more of the pitot tube, the first vane, the second vane, the static port, and the acoustic sensor system based on a comparison of the first aircraft air data parameter outputs and the second aircraft air data parameter outputs.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for an aircraft, the system comprising:
a first air data system comprising:
a first pitot tube positioned to sense a first pitot pressure of an airflow about an exterior of the aircraft; and
a first angle of attack vane positioned to sense a first angle of attack of the aircraft, wherein the first air data system is configured to use the first pitot pressure and the first angle of attack to determine first air data parameters; and
an acoustic sensing system configured to emit acoustic signals about the exterior of the aircraft and sense the acoustic signals as sensed data, wherein the acoustic sensing system is further configured to use the sensed data to determine second air data parameters;
wherein the acoustic sensor system comprises:
a first acoustic sensor; and
a second acoustic sensor;
wherein the first acoustic sensor is positioned on the exterior of the aircraft and lies in a first geometric plane, and the second acoustic sensor is positioned on the exterior of the aircraft and lies in a second geometric plane, different from the first geometric plane; and
wherein the second air data parameters include angle of attack, angle of sideslip, an airspeed, and an air temperature.

2. The system of claim 1, wherein the first air data system further comprises:
an angle of sideslip vane positioned to sense an angle of sideslip of the aircraft; and
at least one first static port configured to sense a first static pressure about the exterior of the aircraft;
wherein the first pitot pressure and the first static pressure are utilized to determine an airspeed of the aircraft.

3. The system of claim 2, further comprising:
a second air data system comprising:
a second pitot tube positioned to sense a second pitot pressure of an airflow about the exterior of the aircraft;
a second angle of attack vane positioned to sense a second angle of attack of the aircraft; and
at least one second static port configured to sense a second static pressure about the exterior of the aircraft.

4. The system of claim 1, further comprising:
an acoustic processing unit configured to receive the sensed data from the acoustic sensor system and generate the second air data parameters based on the sensed data.

5. The system of claim 4, further comprising:
at least one consuming system of the aircraft, wherein the consuming system is configured to receive the first pitot pressure and the first angle of attack and determine the first air data parameters, and is further configured to receive the second air data parameters from the acoustic processing unit.

6. The system of claim 1, wherein the acoustic sensor system comprises:
a first acoustic sensor that includes an emitter, and first, second, third, and fourth microphones, wherein the first and second microphones are positioned along the same axis as each other, the third and fourth microphones are positioned along the same axis as each other, and the axis that includes the first and second microphones is orthogonal to the axis that includes the third and fourth microphones.

7. The system of claim 1, wherein the first and second acoustic sensors are ultrasonic acoustic sensors, and wherein the acoustic signal comprises acoustic pulses.

8. The system of claim 1, wherein the acoustic sensor system further comprises:
at least one static port positioned to sense a static pressure of an airflow about the exterior of the aircraft.

9. A system for an aircraft, the system comprising:
a first pitot tube configured to measure a first pitot pressure on a first side of the aircraft;
at least one first static port configured to sense a first static pressure about the exterior of the aircraft;
a first vane positioned on the exterior of the aircraft and configured to sense a first angle of attack of the aircraft;
an acoustic sensor system that includes a first emitter configured to emit first acoustic signals into the airflow about the exterior of the aircraft and is configured to sense the first acoustic signals as first sensed data; and
the acoustic sensor system further includes an acoustic processing unit, and at least one second static pressure port configured to sense a second static pressure of airflow about an exterior of the aircraft;
wherein the acoustic sensor system further includes a second emitter configured to emit second acoustic signals into the airflow about the exterior of the aircraft and is configured to sense the second acoustic signals as second sensed data, wherein the first emitter and the second emitter are positioned in different geometric planes; and
the acoustic processing unit is configured to generate a first set of aircraft air data parameter outputs based on the first sensed data and is further unit is configured to calculate angle of sideslip, angle of attack, an airspeed, and an air temperature for the aircraft based on the first and second sensed data; and
aircraft consuming systems configured to receive the first pitot pressure, the first static pressure, the first angle of attack, and the first sensed data to determine air data parameters.

10. The system of claim 9, wherein the first sensed data is utilized by the consuming systems to supplement the first pitot pressure and the first angle of attack.

11. The system of claim 9, wherein the aircraft consuming systems are configured to generate a second set of aircraft air data parameter outputs based on the first pitot pressure, the first static pressure, and the first angle of attack, and wherein the first and the second sets of aircraft air data parameter outputs comprise the same set of air data parameters.

12. The system of claim 9, wherein:
a second pitot tube configured to measure a second pitot pressure on a second side of the aircraft opposite the first side;
a second vane positioned on the exterior of the aircraft and configured to sense a second angle of attack of the aircraft;
a third vane positioned on the exterior of the aircraft and configured to sense an angle of sideslip of the aircraft;
wherein the aircraft consuming systems are further configured to receive the second pitot pressure, the second angle of attack, and the angle of sideslip to determine the air data parameters.

13. The system of claim 9, further comprising:
a total air temperature sensor configured to provide a sensed temperature to the aircraft consuming systems, wherein the aircraft consuming systems are further configured to determine the air data parameters using the sensed temperature.

14. A method comprising:
sensing, by a pitot tube positioned on an exterior of an aircraft, a pitot pressure;
sensing, by a first vane positioned on the exterior of the aircraft, an angle of attack;
sensing, by a second vane positioned on the exterior of the aircraft, an angle of sideslip;
sensing, by a static port positioned on the exterior of the aircraft, a static pressure;
generating first aircraft air data parameter outputs based on the pitot pressure, the angle of attack, the angle of sideslip, and the static pressure;
emitting, by an acoustic sensor system positioned on the exterior of the aircraft, acoustic signals;
sensing, by the acoustic sensor system, the acoustic signals as sensed data, wherein the acoustic sensor system comprises:
a first acoustic sensor; and
a second acoustic sensor
wherein the first acoustic sensor is positioned on the exterior of the aircraft and lies in a first geometric plane, and the second acoustic sensor is positioned on the exterior of the aircraft and lies in a second geometric plane different than the first geometric plane; and generating second aircraft air data parameter outputs based on the sensed data; wherein the second aircraft air data parameter outputs include angle of attack, angle of sideslip, and an air temperature.

15. The method of claim 14, further comprising:
determining the presence of a failure condition of one or more of the pitot tube, the first vane, the second vane, the static port, and the acoustic sensor system based on a comparison of the first aircraft air data parameter outputs and the second aircraft air data parameter outputs.

\* \* \* \* \*